No. 704,860. Patented July 15, 1902.
S. S. CONANT.
AUTOMOBILE.
(Application filed Apr. 26, 1902.)
(No Model.) 2 Sheets—Sheet 1.
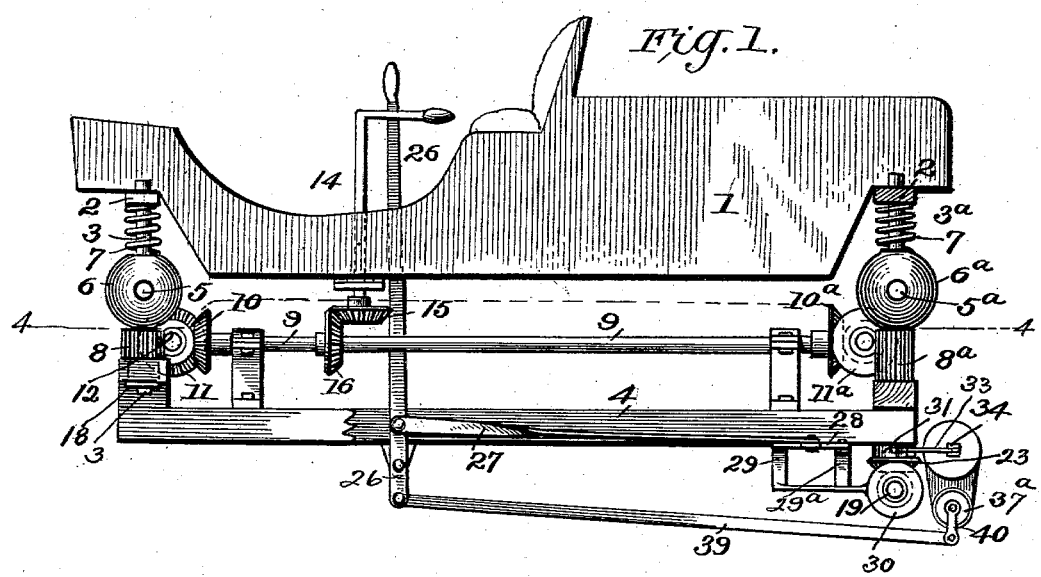
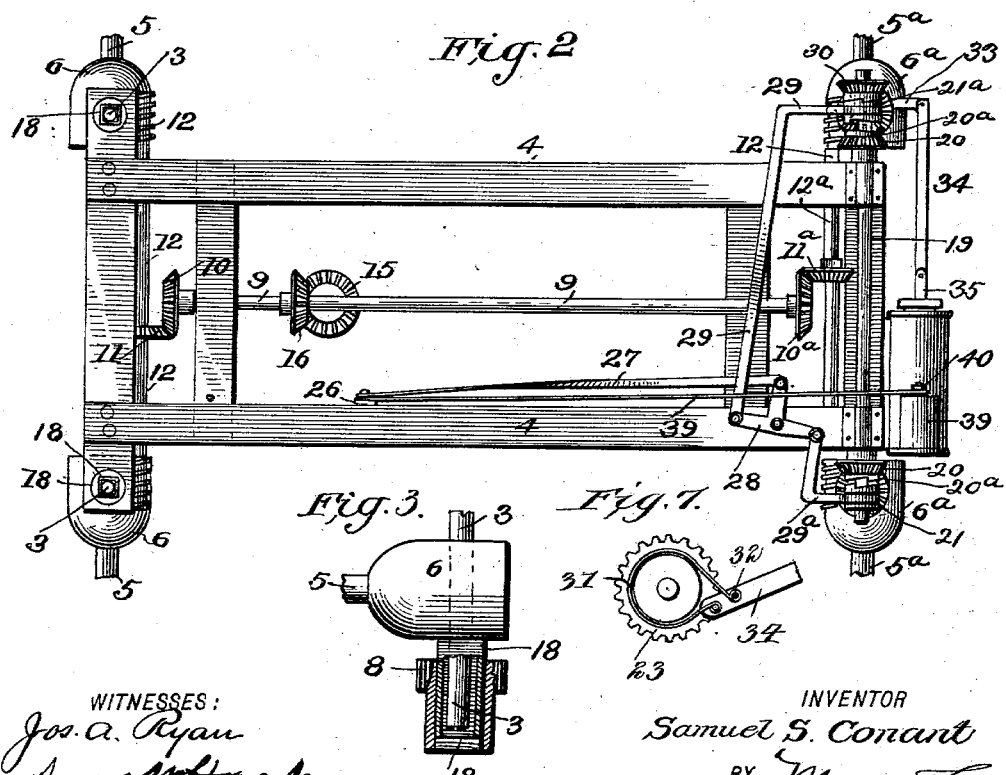
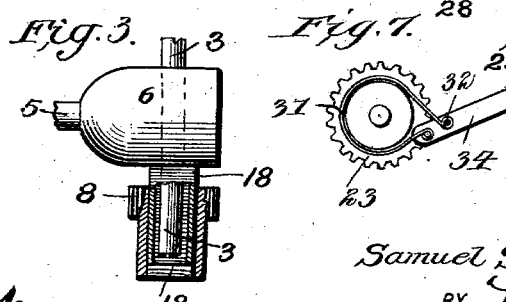
WITNESSES:
Jos. A. Ryan
Ann H Hart
INVENTOR
Samuel S. Conant
BY Munn & Co.
ATTORNEYS No. 704,860. Patented July 15, 1902.
S. S. CONANT.
AUTOMOBILE.
(Application filed Apr. 26, 1902.)
(No Model.) 2 Sheets—Sheet 2.
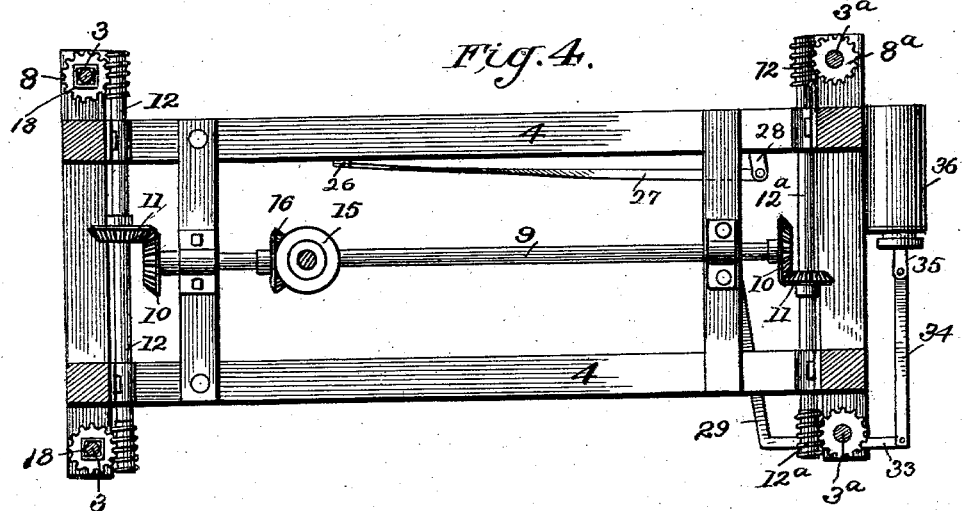
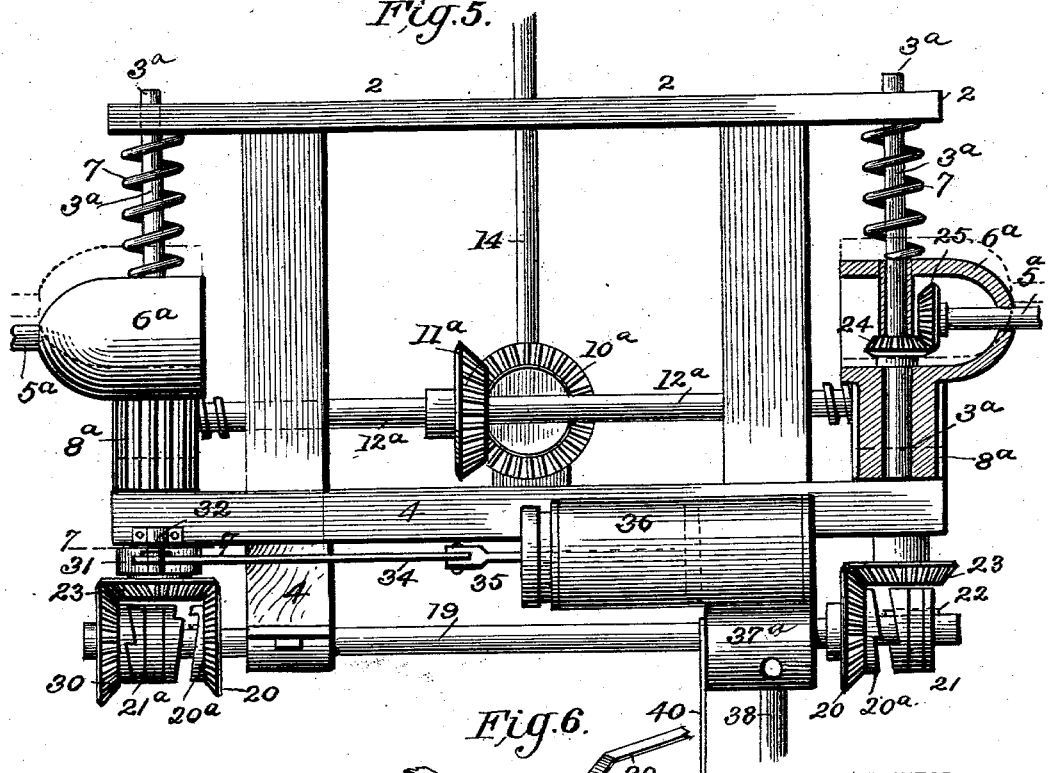
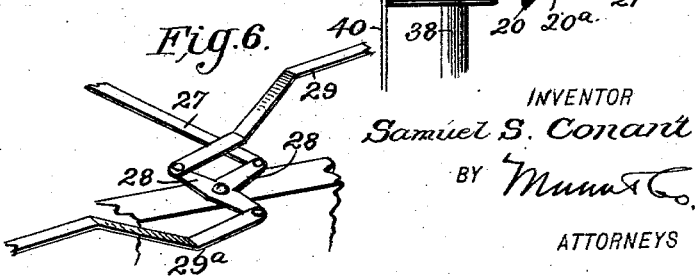
WITNESSES:
Jos. A. Ryan
Amos W. Hart
INVENTOR
Samuel S. Conant
BY Munn & Co.
ATTORNEYS

UNITED STATES PATENT OFFICE.

SAMUEL STORRS CONANT, OF EDGERTON, OHIO.

AUTOMOBILE.

SPECIFICATION forming part of Letters Patent No. 704,860, dated July 15, 1902.

Application filed April 26, 1902. Serial No. 104,789. (No model.)

*To all whom it may concern:*

Be it known that I, SAMUEL STORRS CONANT, a citizen of the United States, residing in Edgerton, in the county of Williams and State of Ohio, have made certain new and useful Improvements in Propelling, Steering, and Braking Mechanism for Automobiles, of which the following is a specification.

My improvement is applicable to self-propelled vehicles, and particularly to that subclass popularly known as "automobiles." The construction and combination of parts are such that the stub-axles of the four wheels are rotatable horizontally around vertical axes and also slidable vertically thereon, so that the said wheels may all be turned together or simultaneously, the two forward wheels turning in the opposite direction to the rear ones, which thereby run in the tracks of the forward ones. Thus the vehicle is turned or steered right or left.

The invention also includes a novel arrangement of springs for supporting the body of the vehicle, the springs resting upon the axle-hubs and both having vertical play on vertical guides and the body of the vehicle being supported indirectly upon said springs. The rear axles and wheels are driven from the driving-shaft of the engine and may be reversed, if required. A brake is applied at the same time the said axles are disconnected from the driving-shaft.

The details of construction, arrangement, and combination of parts are as hereinafter described, reference being had to accompanying drawings, in which—

Figure 1 is a side view of an automobile provided with my improvement, the running wheels being omitted. Fig. 2 is a bottom plan of the same. Fig. 3 is a detail view, part being in section, showing a portion of the front running-gear. Fig. 4 is a horizontal section on the line 4 4 of Fig. 1. Fig. 5 is a rear view, a portion being in section. Fig. 6 is a perspective view of a portion of the lever mechanism employed for operating clutches which operatively connect the driving-shaft of the engine with the rear axles. Fig. 7 is a horizontal section on the line 7 7 of Fig. 5, illustrating the friction-brake.

The body 1 of the vehicle or automobile may be constructed in any preferred manner. It is supported upon horizontal cross-bars 2, (see Fig. 1,) whose ends are provided with vertical perforations to receive the vertical shafts 3 and 3ª, arranged, respectively, at the front and rear end of the vehicle. Spiral springs 7 encircle the said shafts between the cross-bars 2 and the hubs 6 and 6ª, in which the front and rear axles 5 and 5ª are held. In the case of the front axles 5 the connection with the hubs 6 is a rigid one, both the axles and hubs being adapted to swing horizontally upon the shafts 3 and also to slide vertically thereon. Below the hubs 6 are arranged worm-wheels 8, (see Figs. 1 and 4,) which engage a worm-shaft 12, arranged transversely beneath the vehicle-body 1. The hubs of the worm-wheels 8 are arranged rotatably in suitable bearings in the lower portion 4 of the vehicle-frame and provided with a rectangular bore or vertical passage for receiving a square tube 18, (see Figs. 2 and 3,) which is rigidly connected with the hubs 6 and is adapted to slide freely in the wheel 8. By this construction and arrangement of parts it will be seen that while the hubs 6 and axle 5 are adapted to slide vertically upon the shafts 3 the hubs remain rigidly connected with the worm-wheels 8 through the medium of the square tubes 18, and are thus adapted to be swung or rotated in a horizontal plane whatever be their vertical adjustment. Thus the hubs and their axles may be turned horizontally, as required, for steering the vehicle whatever be their vertical adjustment on the shafts 3. It is apparent that the springs 7 will be compressed more or less, according to the weight of the vehicle-body and of the person seated therein.

The rear hubs 6ª with their axles 5ª are adapted to slide vertically on the rear shafts 3ª in the same manner as the forward hubs and axles already described; but in place of being connected with the rear worm-gears 8ª, so as to be separable therefrom, they are rigidly connected therewith, so that the said wheels and hubs slide vertically together on the shafts 3ª. The said worm-wheels 8ª engage the worms of the rear shaft 12ª, but are elongated, as shown, so as to maintain engagement whatever be the vertical or sliding adjustment of the wheels on the shafts 3ª.

For the purpose of rotating the worm-shafts 12 and 12ª, as required, for turning the front and rear wheels, so as to pass around greater or smaller curves, I employ the shaft 9, which is provided at its front and rear ends with the bevel-gears 10 and 10ª, which mesh, respectively, with similar gears 11 and 11ª on the worm-shafts 12 and 12ª. The said shaft 9 is provided with a bevel-gear 16, that meshes with a similar gear 15, keyed on the lower end of a hand crank or shaft 14, that passes through the body of the vehicle and is arranged in suitable proximity to the seat of the latter. It is apparent that by turning the crank-arm of the shaft 14 in one direction or the other the horizontal shaft 9 will be rotated, and thereby the mechanism by which the front and rear axles are turned, as before stated, will be actuated.

The vehicle is propelled by rotation of the rear axles 5ª, the same being suitably connected with a driving-shaft 19, with which the engine or motor (not shown) will in practice be suitably connected. The said motor or engine will be suitably arranged under the body of the vehicle and supported upon the base-frame 4. Bevel-gears 20 (see Figs. 2 and 5) are mounted loose on the drive-shaft 19 and provided on their inner sides with a half-clutch 20ª. Clutches 21 and 21ª are adapted to slide on the drive-shaft 19 adjacent to the said gears 20, the shaft being provided with a feather 22, as shown in Fig. 5, so that the clutches always rotate therewith. The said gears 20 mesh with similar bevel-gears 23, which are keyed upon the lower ends of the rotatable shafts 3ª, whereon the hubs of the rear axles are mounted. Within the hollow hubs 6ª a bevel-gear 24 is keyed on the shafts 3ª and meshes with a similar gear 25 on the axles 5ª. From the foregoing description it will be apparent that if the clutches 21 and 21ª be thrown inward so as to engage the clutches 20ª of the bevel-gears 20 rotation will be imparted to the vertical shafts 3ª 3ª, and thereby to the rear axles 5ª, and thus the rear wheels which will be fixed on the said axles will be driven and propel the vehicle at greater or less speed. For the purpose of adjusting the clutches 21 and 21ª toward or from the gears 20 I employ the lever mechanism illustrated in Figs. 1, 2, and 6. A hand-lever 26 is arranged in suitable proximity to the seat of the vehicle and passes down through the bottom of the latter, it being pivoted on a bracket attached to the base-frame 4. (See Fig. 1.) At a point above its pivot a rod 27 connects the hand-lever with the central arm of a T-shaped lever 28, whose cross-head is connected with the clutches 21 and 21ª by means of the angular arms or rods 29 and 29ª. It will now be understood that when the lever is thrown back or into the position shown in Fig. 1 the T-shaped lever 28 will be thrown in such position as to hold the clutches 21 and 21ª out of engagement with the gears 20. (See Fig. 5.) This is the position of parts when the vehicle is at rest. On the other hand, when it is required to propel the vehicle the hand-lever 26 is thrown forward to an inclined position, whereby the traction of the rod 27 on the T-shaped lever 28 will draw the clutches 21 and 21ª into engagement with the gears 20, and thus the rear axles 5ª will be driven whenever the valve of the motor is open to allow the engine to rotate the drive-shaft 19.

In Figs. 2 and 5 I illustrate a supplemental clutch mechanism by which the engine may be utilized for reversing the rotation of one of the rear wheels, should occasion require, for suddenly arresting the vehicle. The clutch 21ª is made double or two-faced, its outer face being adapted to engage a half-clutch on a bevel-gear 30, which engages the gear 23 on the adjacent shaft 3ª. The clutch-gear 30 is adapted to rotate loose or free on the drive-shaft; but when engaged by the clutch 21ª it is manifest it will rotate in a direction contrary to that of the driving clutch-gears 20, and thus will rotate the rear axle (with which it is operatively connected) in a direction contrary to that obtained through the medium of the said gears 20. Such engagement of the double clutch 21ª with the braking-gear 30 may be effected by suitable manipulation of the hand-lever 26. In other words, when the hand-lever is forced forward to its extreme position such engagement will take place; but it may be so adjusted as to throw the clutch 21ª merely to a position intermediate of the opposite clutches of gears 20 and 30.

Simultaneously with the shifting of the clutches, as before described, for the purpose of disengaging them from the driving-clutch gears 20 I apply a friction-brake, as will now be described. On the hub of one of the bevel-gears 23 (see especially Figs. 5 and 7) I apply a friction-band 31, one of its ends being connected with a fixed stud 32, which is fixed on and pendent from the frame 4, and its other end with the shorter arm of a lever 33, whose outer end is pivoted to the pitman 34, connected with the rod 35 of a piston working in the cylinder 36. The said lever 33 is pivoted on the same fixed stud 32. Below the said cylinder is arranged a valve-cylinder 37, in which a rotary two-way valve 39ª is in practice arranged. (See Fig. 1.) Steam or air is admitted to the valve-cylinder 37 by means of a pipe 38, (see Fig. 5,) and when the valve is suitably adjusted pressure is applied within the cylinder 36 to the piston, which is adapted to slide therein. (See dotted lines, Fig. 5.) It will be seen that if the piston be thus forced toward the left-hand end of the cylinder 36 the lever 33 will apply the friction-brake 31 to the hub on the shaft 3ª, and thereby the rotation of the latter will be hindered or arrested correspondingly, with the final result that the vehicle will be brought to a more or less sudden stop. This brake is applied and disengaged simultaneously with the application and disengagement of the driving-clutches, as before described. For this purpose I connect the rotary valve with the hand-lever 26 through the medium of a rod 39, (see Figs. 1 and 2,) which extends from the lower end of the hand-lever to the outer end of an arm 40, which is rigidly connected with the valve 39ª. When the lever 26 is in the position shown in Fig. 1—that is to say, thrown backward—the brake is applied, since the valve 39ª is then thrown into position to allow air or steam to pass from the inlet-pipe 38 to the cylinder 36, and thus force the piston outward. On the other hand, if the lever 26 be thrown forward, as required for applying the clutches for driving the vehicle, the valve 39ª will be rotated to such position as to cut off the inlet of steam or air to the cylinder 36 and allow the portion which had previously entered the cylinder to escape out the opening 41. (See Fig. 5.) By the above-described clutch and brake mechanism the propulsion and arrest of the vehicle are placed within the easy and effective control of the operator.

Having thus described my invention, what I claim as new, and desire to secure by Letters Patent, is—

1. The combination, with a vehicle-body and base-frame, of vertical guide-shafts, axle-hubs having gears connected therewith and both adapted to slide and rotate on said guides, spiral springs interposed between the hubs and the body of the vehicle and encircling the aforesaid guides, transverse shafts carrying worms that engage the said gears, a third shaft suitably geared with the said transverse shafts, and a hand-shaft geared with such third shaft and adapted to be operated from the seat of the vehicle for swinging the hubs and axles horizontally and thus guiding the vehicle, substantially as shown and described.

2. The combination, with a rigid frame and vertical guides arranged therein, of stub-axles having hubs adapted to slide and rotate on said guides, elongated spur-gears which are rigidly connected with said hubs and arranged slidably on the guide, a horizontal worm-shaft, a hand-crank shaft, and intermediate mechanism connecting it with the worm-shaft, whereby the operator is enabled to shift the axles of the running wheels at different angles to the body of the vehicle, substantially as shown and described.

3. The combination, with a vehicle-body and base-frame, of vertical guides located at the corners of the frame and vehicle-body, hubs mounted slidably and rotatably on said guides and provided with stub-axles, elongated gears rigidly connected with the hubs and similarly mounted on the guides, springs applied to the guides above the hubs and elastically supporting the weight of the vehicle-body and attachments, transverse shafts carrying worms which engage the elongated gears, a shaft arranged longitudinally of the frame and geared with the worm-shaft, and a crank-shaft geared with such longitudinal shaft and projecting upward in proximity to the seat of the vehicle, substantially as shown and described.

4. The combination, with a suitable frame and vertical guides supported thereon, of axle-hubs and elongated gears connected and adapted to slide and rotate on said guides, and means for rotating the axles, the engagement therewith being maintained irrespective of the vertical oscillation of the axles and hubs, substantially as shown and described.

5. The combination with the vehicle-body, the rigid frame and vertical shafts journaled in the latter, of hubs arranged on the shafts, axles journaled in the hubs and geared with the shafts, the said hubs being provided with worm-wheels and adapted to slide vertically on the shafts, springs arranged between the hubs and the frame and pressing upon the hubs, a worm-shaft geared with the hubs, and means for rotating the vertical shafts and also for rotating the hubs for swinging the axles in the horizontal planes, substantially as shown and described.

6. The combination of the vehicle-frame and vertical shafts journaled therein, of hubs which are adapted to slide vertically on the shafts, axles held rotatably in the hubs and geared with said shafts, means for rotating the hubs and thereby swinging the axles horizontally, the drive-shaft and bevel-gearing adapted for driving the aforesaid shafts, clutches for locking the driving-gears with the drive-shaft, and lever mechanism for adjusting said clutches whereby the driving mechanism is thrown into and out of gear, substantially as shown and described.

7. The combination with the vehicle-frame and vertical shafts journaled therein, and axles and hubs arranged rotatably as described, of gearing adapted to be connected with the drive-shaft, clutches for throwing the gearing into and out of action, a brake mechanism comprising a friction device, a cylinder, a piston, and lever mechanism connecting it with the brake proper, a valve for regulating admission of steam to the cylinder, and lever mechanism connected with the clutches and also with the valve whereby the clutches are engaged or disengaged, and the valve simultaneously shifted, correspondingly, for applying or releasing the brake, substantially as shown and described.

8. The combination with the vehicle-frame, vertical shafts, hubs adapted to rotate horizontally thereon, and axles held in said hubs and geared with the said shafts, of means for rotating the hubs and thereby swinging the axle horizontally as required for guiding the vehicle, a drive-shaft and loose gears and clutches mounted thereon, a single and double clutch adapted to engage the same, and lever mechanism connected with the clutches whereby, when the driving-wheels are unlocked, a reversing-wheel, 30, may be brought into action for reversing the rotation of one of the running wheels, substantially as shown and described.

9. The combination with the vehicle-frame and vertical shafts journaled therein, of the front and rear hubs and axles adapted to swing horizontally on said shafts and provided with worm-wheels arranged below the hubs, the said hubs being adapted to slide vertically on the shafts, worm-shafts geared with said wheels, a longitudinal shaft geared with said worm-shafts, a crank-shaft geared with said longitudinal shaft and arranged in proximity to the vehicle-seat, spiral springs applied to the shafts between the vehicle-body and the axle-hubs, a drive-shaft, gears for operatively connecting it with the vertical shafts, clutch mechanism for engaging such gears with the drive-shaft, lever mechanism for adjusting the clutches, and a brake mechanism consisting of the friction-brake proper, a piston-cylinder, piston and rod connecting it with the brake, a valve and means for connecting it with the aforesaid lever mechanism, whereby the valve is operated simultaneously with the shifting of the remaining portion of the lever mechanism by which the driving mechanism is thrown into and out of gear, substantially as shown and described.

10. The combination with the vehicle-body, the rigid frame and shafts journaled vertically therein, of hubs adapted to slide and rotate on the said shafts and provided with axles, springs interposed between the hubs and the vehicle-body, axles secured in said hubs, the hubs having hollow, polygonal, downward extensions surrounding the shafts, worm-wheels applied to such extensions and adapted to rotate therewith, but permitting the extensions to slide vertically, a worm-shaft geared with the said wheel, and means for rotating the said worm-shaft for the purpose of shifting the axles in horizontal planes for guiding of the vehicle, the engagement with the hubs being maintained in any vertical adjustment of the latter, substantially as shown and described.

SAMUEL STORRS CONANT.

Witnesses:
G. R. ANDERSON,
D. G. MORTLAND.